US008065641B2

(12) United States Patent
Gerowitz et al.

(10) Patent No.: US 8,065,641 B2
(45) Date of Patent: Nov. 22, 2011

(54) AUTOMATICALLY CREATING MANUFACTURING TEST RULES PERTAINING TO AN ELECTRONIC COMPONENT

(75) Inventors: Robert Glen Gerowitz, Raleigh, NC (US); Michael Patrick Muhlada, Raleigh, NC (US); Chad Everett Winemiller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/203,038

(22) Filed: Sep. 2, 2008

(65) Prior Publication Data

US 2010/0057425 A1   Mar. 4, 2010

(51) Int. Cl.
G06F 17/50     (2006.01)
G06F 9/45      (2006.01)
(52) U.S. Cl. ......................... 716/104; 716/103
(58) Field of Classification Search .......... 716/103–104, 716/132–133, 136
See application file for complete search history.

(56) References Cited

U.S. PATENT DOCUMENTS

| 5,903,475 | A  | * | 5/1999  | Gupte et al. ............... 703/16 |
| 6,292,931 | B1 | * | 9/2001  | Dupenloup ............... 716/104 |
| 7,100,133 | B1 | * | 8/2006  | Meiyappan et al. ......... 716/102 |
| 7,127,691 | B2 |   | 10/2006 | Cruz et al. |
| 2003/0154465 | A1 | * | 8/2003 | Bollano et al. ............. 717/137 |
| 2004/0163072 | A1 |   | 8/2004 | Levy |

FOREIGN PATENT DOCUMENTS

JP       2005078402 A     3/2005

* cited by examiner

*Primary Examiner* — Stacy Whitmore
(74) *Attorney, Agent, or Firm* — Yee & Associates, P.C.; Daniel H. Schurmann

(57) ABSTRACT

A system for creating manufacturing test rules. Stimuli for an electronic design are generated automatically by a stimuli generator. The stimuli generator takes into account certain limitations of the design when automatically generating the manufacturing test rules. The design is tested by a testbench using the stimuli. A simulation log for the design is generated by the testbench. The simulation log is then processed by a simulation log processor. An HDL representation of the design is generated by the simulation log processor using the processed simulation log. A gate-level version of the design is generated by a synthesis tool using the HDL representation of the design. The gate-level version of the design is further processed by the synthesis tool to make any necessary modifications. Then, the gate-level version of the design is outputted as the final manufacturing test rule. Thus, creating manufacturing test rules can be completely automated.

15 Claims, 4 Drawing Sheets

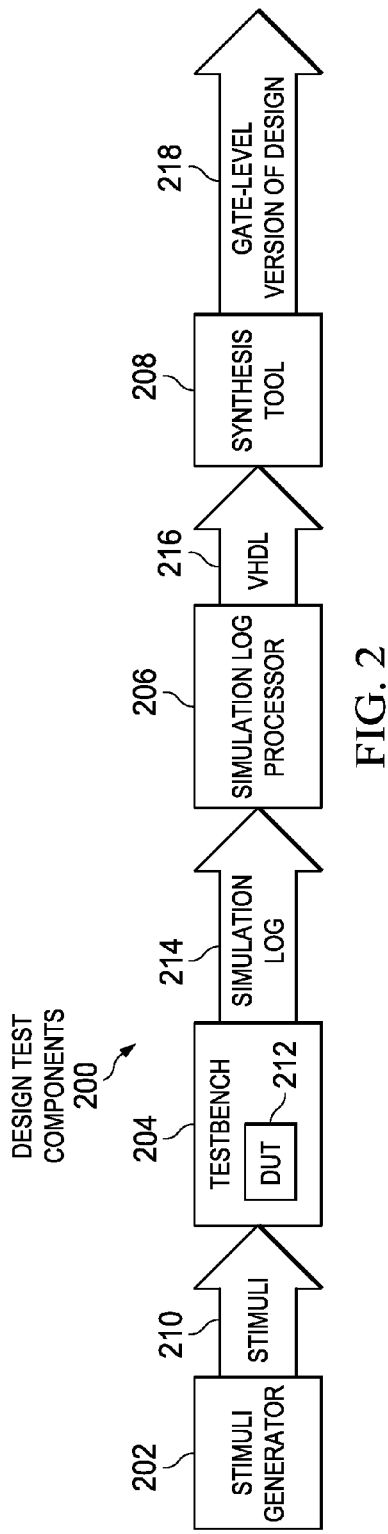

```
library IEEE;
use IEEE.std_logic_1164.all;
entity ttl is
    port (
                            A : in std_logic;
                            B : in std_logic;
                            C : in std_logic;
                            Z : out std_logic) ;
end entity ttl;

architecture rtl of ttl is
    signal tmp : std_logic_vector (2 downto 0);
begin tmp <= A & B & C ;
    with tmp select
            Z <=
                            '1' when "010",
                            '1' when "011",       OUPUT
                            '0' when "100",       402
                            '0' when "101",
                            "X' when others ;
end architecture rtl;
```

VHDL 400

AUTOMATICALLY CREATING MANUFACTURING TEST RULES PERTAINING TO AN ELECTRONIC COMPONENT

BACKGROUND OF THE INVENTION

1. Field of the Invention

The present invention relates generally to improved data processing system and more specifically to a computer implemented method, system, and computer usable program code for automatically creating manufacturing test rules for electronic components or designs.

2. Description of the Related Art

Currently, creating manufacturing test rules for an electronic design is a long and laborious process. Typically, creating manufacturing test rules is done by manually entering a logical representation of a circuit into a file. Then, a considerable amount of time is spent verifying the equivalence of this design and the circuit models. For simple circuit models, such as AND, OR, or INVERTER circuits, this process of creating manufacturing test rules is relatively straightforward. However, for more complex circuits, or even analog circuit designs, this process can be extremely difficult and very error prone. Other aspects that make this process more difficult are handling situations where different power, ground, voltage bias, and current references are used, as well as current mode logic (CML).

BRIEF SUMMARY OF THE INVENTION

According to one embodiment of the present invention, manufacturing test rules are generated. Stimuli for an electronic design are generated automatically by a stimuli generator. The stimuli generator takes into account certain limitations of the design when automatically generating the stimuli. The design is then simulated within a testbench using the stimuli, which is a collection of input vectors, automatically generated by the stimuli generator. A simulation log for the design is generated by the testbench. The simulation log is processed by a simulation log processor. A Hardware Description Language (HDL) representation of the design is generated by the simulation log processor using the processed simulation log. A gate-level version of the design is generated by a synthesis tool using the HDL representation of the design as an input. The gate-level version of the design is optionally post-processed by the synthesis tool to make any further necessary modifications. Then, the gate-level version of the design is outputted as the generated manufacturing test rule for use by a user.

BRIEF DESCRIPTION OF THE SEVERAL VIEWS OF THE DRAWINGS

FIG. 2 is an exemplary illustration of design test components in accordance with an illustrative embodiment;

FIG. 3 is an exemplary illustration of an input table in accordance with an illustrative embodiment;

FIG. 4 is an exemplary illustration of a VHDL file in accordance with an illustrative embodiment.

DETAILED DESCRIPTION OF THE INVENTION

Figure 1:
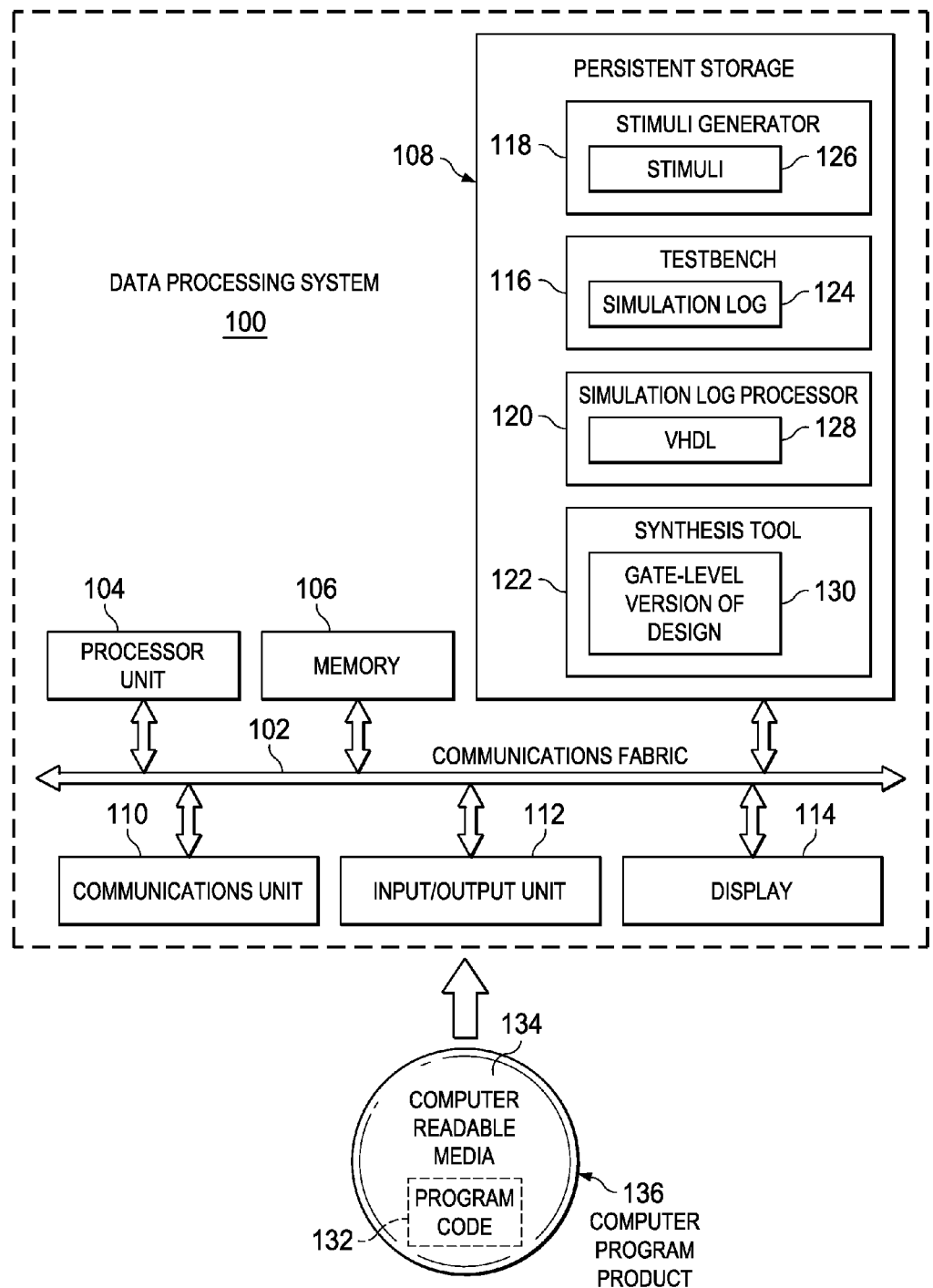
FIG. 1 is a diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

In this illustrative example, data processing system 100 includes communications fabric 102, which provides communications between processor unit 104, memory 106, persistent storage 108, communications unit 110, input/output (I/O) unit 112, and display 114. Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

In this exemplary illustration, persistent storage 108 contains testbench 116, stimuli generator 118, simulation log processor 120, and synthesis tool 122. However, it should be noted that even though testbench 116, stimuli generator 118, simulation log processor 120, and synthesis tool 122 are shown as separate components in this example, two or more of these components may be combined to form a single component. Testbench 116, stimuli generator 118, simulation log processor 120, and synthesis tool 122 are software components that illustrative embodiments utilize to create relevant stimuli for a design, execute a simulation of the design based on this stimuli, analyze the result of the simulation, and then generate a gate-level version of that design to be used as the manufacturing test rule. Illustrative embodiments may be used for digital circuit designs, as well as analog circuit designs. Illustrative embodiments treat analog logic as equivalent to digital logic.

Testbench 116 is the component that verifies and validates the functionality of a design. Testbench 116 may be simulated using any standard simulator, such as, for example, NCSim® which is a product of Cadence Design Systems, Inc. Testbench 116 observes the function of the design through simulation and analyzes the result of the simulation. Then, testbench 116 stores the analyzed result in a file, such as simulation log 124. Simulation log 124 is a collection of the stimulus and response of the design or device under test (DUT).

Stimuli generator 118 is the component that automatically generates the stimuli for the design. The stimuli include the appropriate sets of input stimuli patterns or combinations that account for certain limitations, represented as stimuli 126, which testbench 116 uses to stimulate the DUT, along with the expected simulation result. Stimuli generator 118 sends stimuli 126 to testbench 116. Stimuli 126 comprises the simulation test case that testbench 116 uses to simulate the DUT.

Stimuli generator 118 is a custom program that calculates the input values for the stimuli and writes the input values in a format that may be simulated by, for example, an analog simulator or a digital simulator. Stimuli generator 118 recognizes and takes into account certain limitations regarding designs, such as, for example, which input pins must be differential (i.e., if one input pin is being fed a zero value, then the other input pin must be fed a one value) and which input pins are power pins or current bias pins. For example, assume that a design has three inputs, pin A, pin B, and pin C. Further, assume that the design has a limitation that pin A and pin B have to be differential. Using this scenario, stimuli generator 118 automatically generates a simulation test case that accommodates these input stimuli and limitations.

Simulation log processor 120 is the component that processes simulation log 124 to generate a high-level description of the circuit using a Hardware Description Language (HDL), which is represented as VHDL 128. VHDL (very high speed integrated circuits hardware description language) is an industry standard language used to describe (model) and simulate designs. VHDL in this instance describes the design using constructs, such as, for example, "if-then" and "case" statements, to perform a desired function. While VHDL is described in this illustrative embodiment, it should be noted that illustrative embodiments are not limited to VHDL explicitly. Other HDLs, such as Verilog, are completely viable as long as a synthesis tool, such as synthesis tool 122, can produce a gate-level version of the design from the HDL input.

Synthesis tool 122 is the component that generates the gate-level version of the design, which is represented as gate-level version of the design 130. Synthesis tool 122 generates gate-level version of the design 130 by translating VHDL 128 into a real hardware (i.e., gates and wires) representation. In other words, synthesis tool 122 is capable of automatically mapping specific constructs of a hardware description language directly to standard components of an integrated circuit.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 132 is located in a functional form on computer readable media 134 that is selectively removable and may be loaded onto or transferred to data processing system 100 for execution by processor unit 104. Program code 132 and computer readable media 134 form computer program product 136 in these examples. In one example, computer readable media 134 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 134 also may take the form of a persistent storage, such as a hard drive, a thumb drive, or a flash memory that is connected to data processing system 100. The tangible form of computer readable media 134 is also referred to as computer recordable storage media. In some instances, computer readable media 134 may not be removable.

Alternatively, program code 132 may be transferred to data processing system 100 from computer readable media 134 through a communications link to communications unit 110 and/or through a connection to input/output unit 112. The communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 134 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Illustrative embodiments provide a computer implemented method, system, and computer usable program code for automatically generating manufacturing test rules for integrated circuit designs. The integrated circuit designs include digital circuit designs, as well as analog circuit designs. By using illustrative embodiments, resources now spent creating manufacturing test rules and verifying these rules may be considerably reduced. Illustrative embodiments examine the inputs of a design, determine all possible input combinations, while recognizing and accounting for certain limitations concerning the design, and then simulate the design using the input combinations.

Illustrative embodiments then create a VHDL representation of the design based on the results of the simulation. Afterward, illustrative embodiments synthesize the VHDL representation to generate a gate-level version of the design. It should be noted that illustrative embodiments during this manufacturing test rule generation process account for and handle power pins, ground, various voltage biases, and current sources, as well as current mode logic (CML). CML is a differential digital logic family intended to transmit data at speeds between 312.5 megabits/second and 3.125 gigabits/second over a standard printed circuit board.

Illustrative embodiments utilize a standard testbench or simulator to discern the operation and functionality of the design. In addition, illustrative embodiments utilize a standard synthesis tool to create the gate-level version of the design. Illustrative embodiments take an existing schematic representation of a design and derive an abstracted view of this design.

With reference now to FIG. 2, an exemplary illustration of design test components is depicted in accordance with an illustrative embodiment. Design test components 200 comprises a plurality of software components utilized by illustrative embodiments to automatically create manufacturing test rules for a design. Design test components 200 include stimuli generator 202, testbench 204, simulation log processor 206, and synthesis tool 208. Stimuli generator 202, testbench 204, simulation log processor 206, and synthesis tool 208 may, for example, be testbench 116, stimuli generator 118, simulation log processor 120, and synthesis tool 122 in FIG. 1. Stimuli generator 202 generates stimuli 210 and then sends stimuli 210 to testbench 204. Stimuli 210 may, for example, be stimuli 126 in FIG. 1. Stimuli 210 are the input stimuli or vectors created specifically for DUT 212. Testbench 204 uses stimuli 210 as input values for discerning the functionality of DUT 212.

During the simulation process, testbench 204 collects and analyzes data regarding DUT 212. Afterward, testbench 204 stores this analyzed data in simulation log 214. Simulation log 214 may, for example, be simulation log 124 in FIG. 1. Then, testbench 204 sends simulation log 214 to simulation log processor 206. Simulation log processor 206 processes simulation log 214 to generate VHDL 216. However, it should be noted that in an alternative illustrative embodiment, simulation log processor 206 may process simulation log 214 to generate a Verilog HDL instead of VHDL 216. VHDL 216 may, for example, be VHDL 128 in FIG. 1. Simulation log processor 206 sends VHDL 216 to synthesis tool 208. Synthesis tool 208 synthesizes VHDL 216 to generate gate-level version of the design 218. Gate-level version of the design 218 may, for example, be gate-level version of the design 130 in FIG. 1. Gate-level version of the design 218 is the gate-level representation of DUT 212.

With reference now to FIG. 3, an exemplary illustration of an input table is depicted in accordance with an illustrative embodiment. Input table 300 is an example of stimuli, such as stimuli 210 in FIG. 2, which a testbench, such as testbench 204 in FIG. 2, utilizes to discern the functionality of a design, such as DUT 212 in FIG. 2. It should be noted that even though the values in input table 300 are shown in a table format, the actual values are in a less human readable format, but are structured so that the values may be read by any standard testbench or simulator.

Input table 300 includes inputs 302. A stimuli generator, such as stimuli generator 202 in FIG. 2, generates inputs 302, taking into account certain limitations of the DUT design. Inputs 302 includes input pin A 306, input pin B 308, and input pin C 310. Input pin A 306, input pin B 308, and input pin C 310 are sets of different input stimuli patterns or combinations. In this example, a limitation exists in the design such that input pin A 306 and input pin B 308 are required to be differential. In other words, the stimuli generator generates different values (i.e., not the same value) for input pin A 306 and input pin B 308. Thus, the stimuli generator removes any pattern with the same value for input pin A 306 and input pin B 308. Consequently, when input pin A 306 has a value of zero, input pin B 308 has a value of one and when input pin A 306 has a value of one, input pin B 308 has a value of zero.

With reference now to FIG. 4, an exemplary illustration of a VHDL file is depicted in accordance with an illustrative embodiment. VHDL 400 may, for example, be VHDL 216 in FIG. 2. VHDL 400 is a VHDL representation of a design under test, such as DUT 212 in FIG. 2. However, it should be noted that alternative illustrative embodiments may use other hardware description languages, such as, for example, Verilog, to represent the design under test without deviating from the scope or spirit of illustrative embodiments.

A simulation log processor, such as simulation log processor 206 in FIG. 2, generates VHDL 400 by processing a simulation log, such as simulation log 214 in FIG. 2. VHDL 400 includes output 402. Output 402 is the actual result of a simulation of the design under test derived from processing the simulation log.

In this example, the simulation log notes that when the values for input pins A, B, and C, such as input pin A 306, input pin B 308, and input pin C 310 in FIG. 3, are zero, one, zero, respectively, the actual output result is one. Similarly, when the values for input pins A, B, and C are zero, one, one, respectively, the actual output result is also one. However, when the values for input pins A, B, and C are one, zero, zero or one, zero, one, respectively, the actual output value is zero. Consequently, the simulation log processor generates VHDL 400 as shown using data contained in the simulation log.

Figure 5:
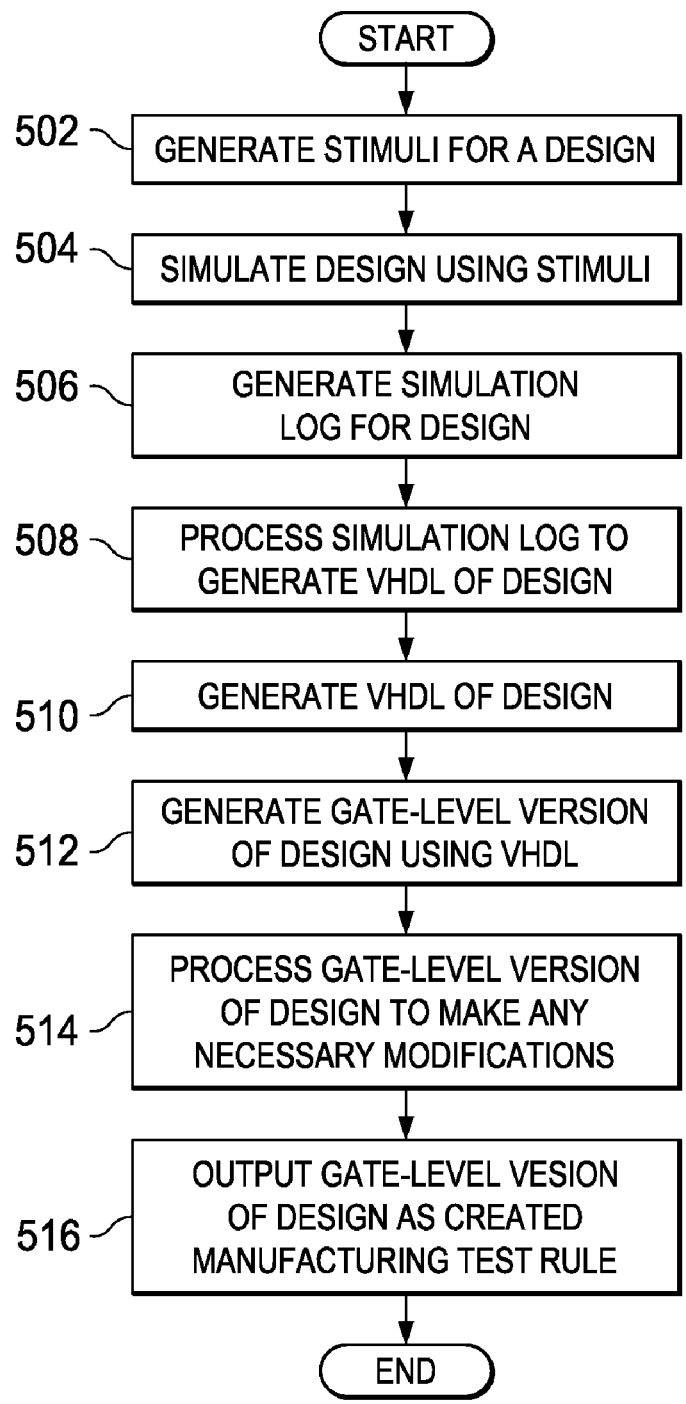
FIG. 5 is a flowchart illustrating an exemplary process for generating a gate-level version of a design in accordance with an illustrative embodiment.

With reference now to FIG. 5, a flowchart illustrating an exemplary process for generating a manufacturing test rule of a design by creating a gate-level version of this design is shown in accordance with an illustrative embodiment. The process shown in FIG. 5 may be implemented in a data processing system, such as data processing system 100 in FIG. 1.

The process begins when the data processing system uses a stimuli generator, such as stimuli generator 118 in FIG. 1, to generate a set of input, such as input table 300 in FIG. 3, to form the stimuli for a design, such as an analog circuit design (step 502). Then, the data processing system uses a testbench, such as testbench 116 in FIG. 1, to simulate the design by utilizing the set of input stimuli patterns (step 504).

Then, the testbench generates a simulation log for the simulation of the design under test (step 506). Afterward, the data processing system uses a simulation log processor, such as simulation log processor 120 in FIG. 1, to process the simulation log to generate a behavioral VHDL representation, such as VHDL 128 in FIG. 1 (step 508). Then, the simulation log processor generates the VHDL representation of the design under test (step 510). This VHDL is a standard VHDL, which may be synthesized by any synthesis tool that follows the basic IEEE VHDL coding standards.

Subsequently, the data processing system uses a synthesis tool, such as synthesis tool 122 in FIG. 1, to generate a gate-level version of the design, such as gate-level version of the design 130 in FIG. 1, by using the VHDL abstract design (step 512). Then, the synthesis tool may optionally use, for example, a clean-up program to process the gate-level version of the design to make any necessary modifications, such as to correct formatting problems or remove faults (step 514). Afterward, the data processing system outputs the gate-level version of the design as the created manufacturing test rule to a display unit or printing device, such as display 114 or input/output unit 112 in FIG. 1, for a user, such as an engineer, to review (step 516).

Thus, illustrative embodiments of the present invention provide a computer implemented method, system, and computer program product for creating manufacturing test rules for a design. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store, the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for generating manufacturing test rules, the computer implemented method comprising:
   generating, by the data processing system, stimuli for a design automatically by a stimuli generator, wherein the stimuli generator takes into account certain limitations of the design when automatically generating the stimuli;
   simulating, by the data processing system, the design by a testbench, wherein the testbench uses the stimuli automatically generated by the stimuli generator;
   generating, by the data processing system, a simulation log for the design by the testbench;
   processing, by the data processing system, the simulation log by a simulation log processor to form a processed simulation log;
   generating, by the data processing system, a hardware description language (HDL) representation of the design by the simulation log processor using the processed simulation log;
   generating, by the data processing system, a gate-level version of the design by a synthesis tool using the HDL representation of the design;
   processing, by the data processing system, the gate-level version of the design by the synthesis tool to make any necessary modifications; and
   outputting, by the data processing system, the gate-level version of the design as a manufacturing test rule for the design.

2. The computer implemented method of claim 1, wherein the design is an analog design.

3. The computer implemented method of claim 1, wherein the certain limitations of the design are how to handle power pins, ground, voltage bias pins, current sources, and current mode logic.

4. The computer implemented method of claim 1, wherein the stimuli include sets of input value patterns for a plurality of input pins in the design to test the design.

5. The computer implemented method of claim 4, wherein two input pins within the plurality of input pins have differential input value patterns within the sets of input value patterns, wherein the differential input value patterns input a different value into each of the two input pins at a same time.

6. A computer program product stored in a computer readable storage medium having computer usable program code embodied therein that is executable by a computer for generating manufacturing test rules, the computer program product comprising:
   computer usable program code for generating stimuli for a design automatically by a stimuli generator, wherein the stimuli generator takes into account certain limitations of the design when automatically generating the stimuli;
   computer usable program code for simulating the design by a testbench, wherein the testbench uses the stimuli automatically generated by the stimuli generator;
   computer usable program code for generating a simulation log for the design by the testbench;
   computer usable program code for processing the simulation log by a simulation log processor to form a processed simulation log;
   computer usable program code for generating a hardware description language (HDL) representation of the design by the simulation log processor using the processed simulation log;
   computer usable program code for generating a gate-level version of the design by a synthesis tool using the HDL representation of the design;
   computer usable program code for processing the gate-level version of the design by the synthesis tool to make any necessary modifications; and
   computer usable program code for outputting the gate-level version of the design as a manufacturing test rule for the design.

7. The computer program product of claim 6, wherein the design is an analog design.

8. The computer program product of claim 6, wherein the certain limitations of the design are how to handle power pins, ground, voltage bias pins, current sources, and current mode logic.

9. The computer program product of claim 6, wherein the stimuli include sets of input value patterns for a plurality of input pins in the design to test the design.

10. The computer program product of claim 9, wherein two input pins within the plurality of input pins have differential input value patterns within the sets of input value patterns, wherein the differential input value patterns input a different value into each of the two input pins at a same time.

11. A data processing system for generating manufacturing test rules, the data processing system comprising:
    a bus system;
    a storage device connected to the bus system, wherein the storage device stores computer usable program code; and a processor unit connected to the bus system, wherein the processor unit executes the computer usable program code to generate stimuli for a design automatically by a stimuli generator, wherein the stimuli generator takes into account certain limitations of the design when automatically generating the stimuli; simulate the design by a testbench, wherein the testbench uses the stimuli automatically generated by the stimuli generator; generate a simulation log for the design by the testbench; process the simulation log by a simulation log processor to form a processed simulation log; generate a hardware description language (HDL) representation of the design by the simulation log processor using the processed simulation log; generate a gate-level version of the design by a synthesis tool using the HDL representation of the design; process the gate-level version of the design by the synthesis tool to make any necessary modifications; and output the gate-level version of the design as a manufacturing test rule for the design.

12. The data processing system of claim 11, wherein the design is an analog design.

13. The data processing system of claim 11, wherein the certain limitations of the design are how to handle power pins, ground, voltage bias pins, current sources, and current mode logic.

14. The data processing system of claim 11, wherein the stimuli include sets of input value patterns for a plurality of input pins in the design to test the design.

15. The data processing system of claim 14, wherein two input pins within the plurality of input pins have differential input value patterns within the sets of input value patterns, wherein the differential input value patterns input a different value into each of the two input pins at a same time.

* * * * *